US011365773B2

(12) United States Patent
Iklé

(10) Patent No.: US 11,365,773 B2
(45) Date of Patent: Jun. 21, 2022

(54) MULTI-DISC BRAKE FOR A VEHICLE DRIVE, AND A VEHICLE DRIVE

(71) Applicant: I&W Engineering AG, Jona (CH)

(72) Inventor: Adrian Iklé, Jona (CH)

(73) Assignee: I&W Engineering AG, Jona (CH)

( * ) Notice: Subject to any disclaimer, the term of this patent is extended or adjusted under 35 U.S.C. 154(b) by 183 days.

(21) Appl. No.: 16/919,189

(22) Filed: Jul. 2, 2020

(65) Prior Publication Data

US 2021/0003182 A1 Jan. 7, 2021

(30) Foreign Application Priority Data

Jul. 4, 2019 (CH) ..................................... 00882/19

(51) Int. Cl.
*F16D 65/28* (2006.01)
*F16D 55/36* (2006.01)
*F16D 121/24* (2012.01)

(52) U.S. Cl.
CPC .............. *F16D 55/36* (2013.01); *F16D 65/28* (2013.01); *F16D 2121/24* (2013.01)

(58) Field of Classification Search
CPC ...... F16D 55/36; F16D 65/28; F16D 2121/24; F16D 55/38; F16D 59/02; F16D 2121/22; F16D 27/115; F16D 2027/008; B60T 7/12
See application file for complete search history.

(56) References Cited

U.S. PATENT DOCUMENTS

| 463,246 A | 11/1891 | Blinn |
| 2,217,464 A * | 10/1940 | Arnold ..................... F16D 27/08 |
| | | 188/72.1 |
| 2,729,310 A * | 1/1956 | Le Tourneau .......... F16D 59/02 |
| | | 192/84.91 |

(Continued)

FOREIGN PATENT DOCUMENTS

| DE | 20 2012 000897 U1 | 2/2012 |
| EP | 1 001 508 A2 | 5/2000 |
| EP | 1 914 154 A1 | 4/2008 |

(Continued)

OTHER PUBLICATIONS

European Search Report dated Jul. 22, 2020 for EP 20 18 1977.

*Primary Examiner* — David J Hlavka
(74) *Attorney, Agent, or Firm* — Paul D. Bianco; Gary S. Winer; Fleit Intellectual Propety Law

(57) ABSTRACT

A multi-disc brake includes an annular brake coil holder with a wound brake coil, an armature plate with a disc support to which a multiplicity of armature plate discs is fastened. A compression spring brings about a linear spacing of the brake coil holder from the armature plate made of a ferromagnetic material in a braking position of the multi-disc brake and, when current is applied to the brake coil, a released position of the multi-disc brake can be created by attracting the armature plate in the direction of the brake coil holder. The braking effect results from the interaction of the armature plate discs with drive shaft discs on a drive shaft.

(Continued)

The brake coil holder area of the brake coil holder and the cross-sectional area of the brake coil are substantially of rectangular single-legged design, and when installing the multi-disc brake, part of the wall of the drive support surrounds the brake coil on two sides and the brake coil holder on one side.

9 Claims, 2 Drawing Sheets

(56) References Cited

U.S. PATENT DOCUMENTS

| | | | | |
|---|---|---|---|---|
| 3,752,267 | A | * 8/1973 | Dovell | ............... F16D 55/36 192/70.17 |
| 2013/0192934 | A1 | 8/2013 | Knop | |

FOREIGN PATENT DOCUMENTS

| | | | |
|---|---|---|---|
| EP | 1914154 | A1 | 4/2008 |
| EP | 2 135 767 | A2 | 12/2009 |
| EP | 2135767 | A2 | 12/2009 |
| JP | H03 209030 | A | 9/1991 |
| WO | 2006/033149 | A1 | 3/2006 |

\* cited by examiner

FIG. 1  Released Position
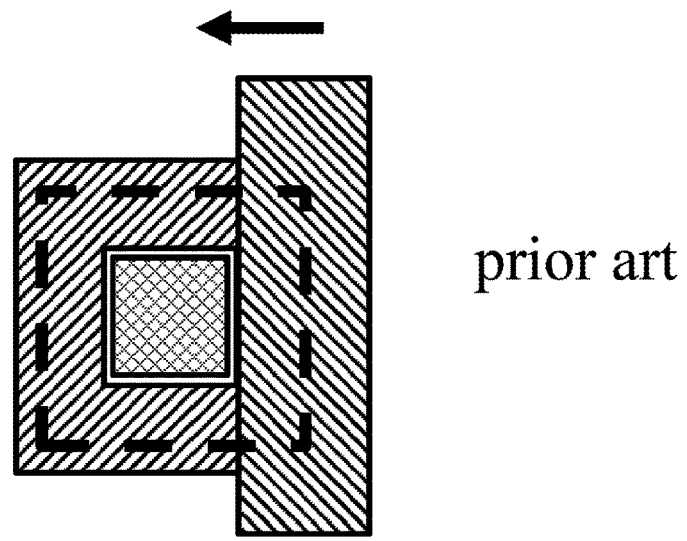
prior art
FIG. 2
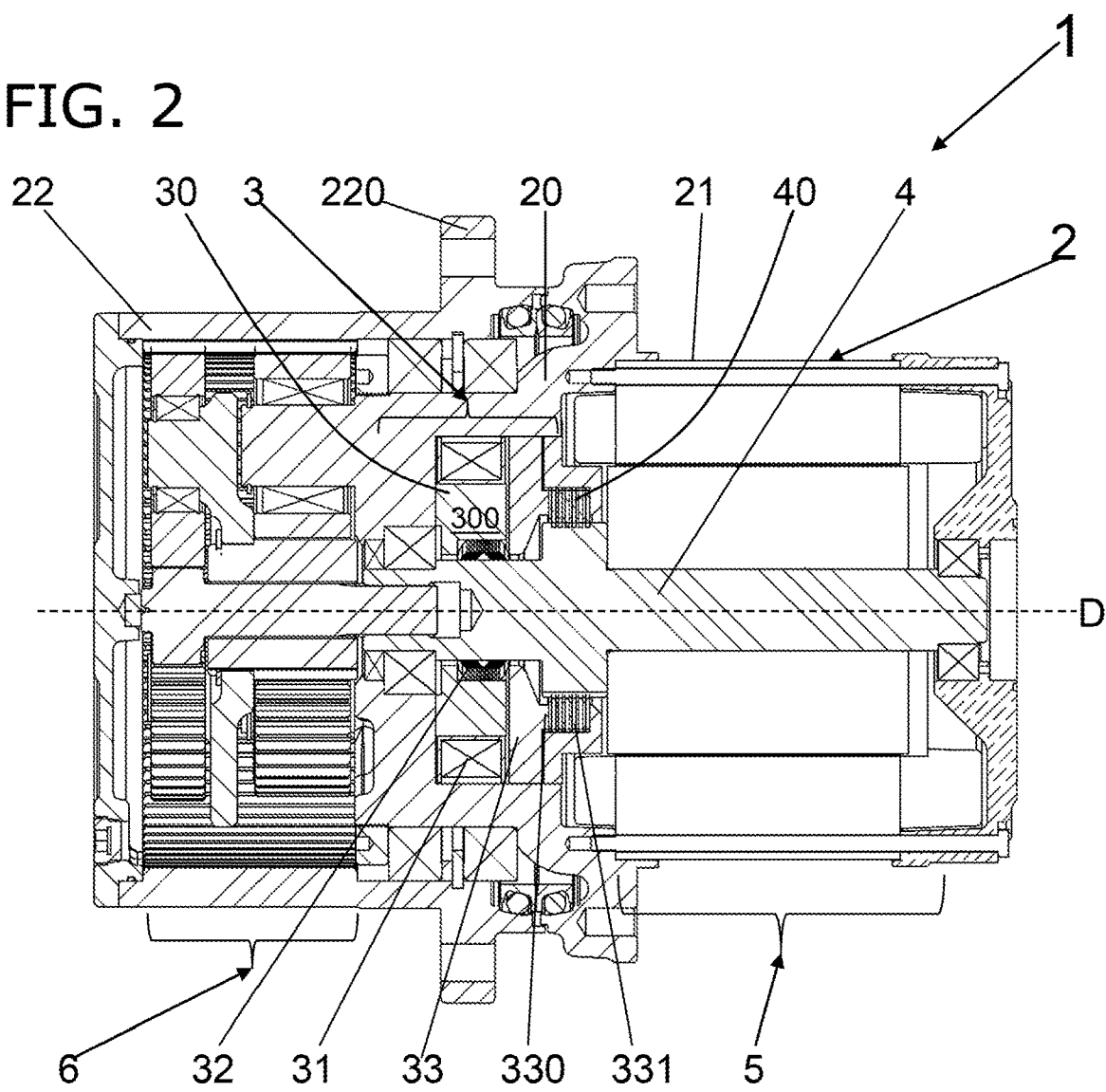

FIG. 3
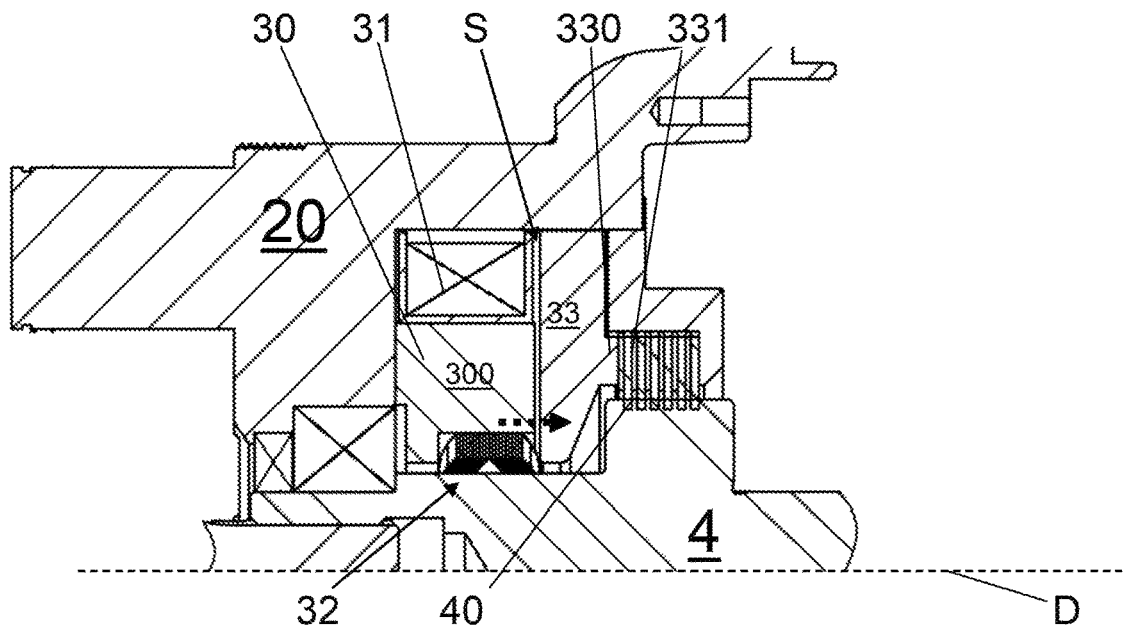
FIG. 4  Released Position
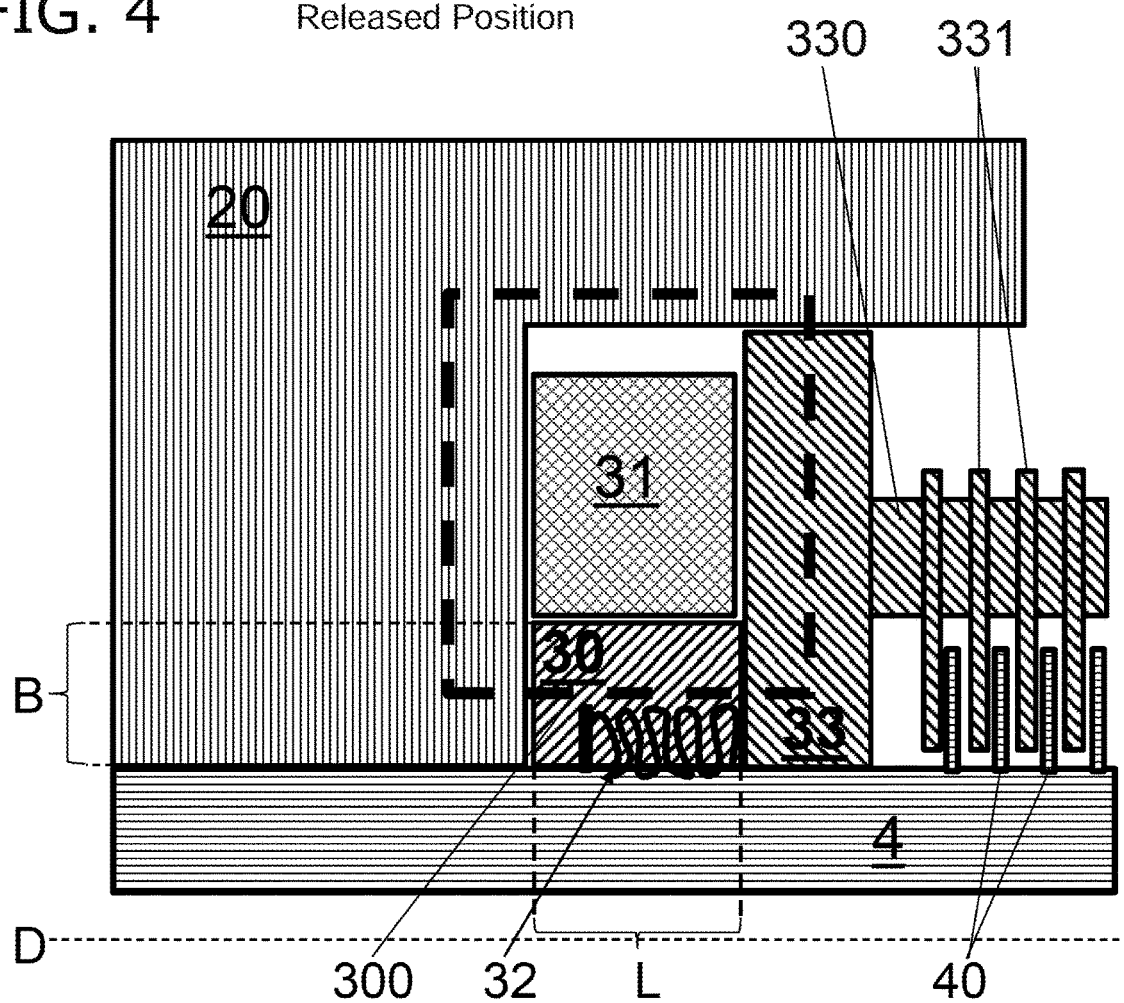

MULTI-DISC BRAKE FOR A VEHICLE DRIVE, AND A VEHICLE DRIVE

TECHNICAL FIELD

The present disclosure describes a multi-disc brake as a parking or emergency brake, which can be installed in an interior of a drive support of a vehicle drive, comprising an annular brake coil holder with a wound brake coil, an armature plate with a disc carrier to which a multiplicity of armature plate discs is fastened, wherein a compression spring brings about a linear spacing of the brake coil holder from the linearly movable armature plate made of a ferromagnetic material in a braking position of the multi-disk brake and, when current is applied to the brake coil, a released position of the multi-disk brake can be created by attracting the armature plate in the direction of the brake coil holder, wherein the braking effect results from the interaction of the armature plate discs with drive shaft discs on a drive shaft, a vehicle drive for vehicles with torques greater than 800 Nm and speeds less than 60 km/h, comprising a drive housing with a drive support, a motor support in which an electric motor is arranged and a transmission support in which a transmission is arranged, wherein the electric motor and the transmission are arranged connected via a drive shaft, and the use of a ferromagnetic drive support as part of a multi-disc brake.

BACKGROUND

The present patent application relates to vehicle drives for vehicles with high torques and low speeds. The maximum speeds of vehicles with such vehicle drives are a maximum of 60 km/h and the torques are higher than 800 Nm. Typical applications are in the field of agricultural vehicles, robots, construction machines such as stone crushers, lifting platforms or tunnel construction machines and other industrial vehicles, e.g. transport platforms.

In all these applications, the installation space of the vehicle drive is a decisive factor. The vehicle drive should be as short as possible in order not to impair the maneuverability of the vehicle or make it possible in the first place; this can be useful, for example, when used in plantations. Furthermore, the vehicle drive, for example in tracked vehicles, should not protrude to the side. For safety reasons it is imperative for all these vehicles to have a brake as a parking or emergency brake.

The parking or emergency brake is applied when the brake is not actuated and must be operated, thus released, to drive the vehicle. For this purpose, a sufficiently high magnetic flux or magnetic field must be generated by a current flow.

From U.S. Pat. No. 463,246, such a vehicle drive is known as a hydraulic drive. Here, the vehicle drive has a flange for mounting on a vehicle and has another flange for the output. The vehicle drive is formed by a drive housing. A hydraulic motor is located inside the drive housing or projects at least partially into the same. Completely inside the drive housing there are, among other things, a brake and a transmission. To save space, the brake is located between the transmission and the hydraulic motor. A simple changeover from hydraulic drives to today's desired vehicle drives with electric motor only seems simple at first glance. A simple replacement of the hydraulic motor by an electric motor when using known parking or emergency brakes does not seem possible without building larger drive housings or completely redesigning the interior of the drive housing including the internal components in order to achieve a sufficiently functioning parking or emergency brake that fits into the drive housing with the same installation space.

Achieving a compact drive housing is problematic in the case of an arrangement of a parking or emergency brake with the desired known braking effect. EP1914154 shows a vehicle drive with a drive housing in which an electric motor and two electromagnetic brakes arranged one behind the other are used. These brakes are designed as multi-disc brakes and could also be used as parking and emergency brakes. The multi-disc brake comprises a brake housing and typical yoke-like brake coil holders in which the brake coils are installed. In the case of a plurality of such multi-disc brakes, only an enlarged, non-compact design of the drive housing can be achieved, or the drive housing is inevitably designed to be more protruding, since the entire brake is also installed in a brake housing. In the drive housing of EP1914154, several larger empty spaces are also visible, so that the available space is not optimally utilized. Furthermore, it seems questionable whether the desired braking effect is achieved with the two electromagnetic brakes.

The use of an electromagnetic brake with "magnetic pot" or the typical yoke-like design of the brake coil holders is typical. In order to achieve a higher torque and a long service life, a multi-disc brake with several metallic discs is recommended, which brake a drive shaft via an armature plate. Multi-disc brakes are advantageous because they show only minor wear and tear, are almost maintenance-free and are therefore reliable and durable.

Initial tests have not achieved a sufficiently high desired braking effect with commercially available multi-disc brakes. When using a multi-disc brake, it has so far hardly been possible to generate sufficient braking torque in the available installation space, despite a configuration with the largest possible brake coil area and very thin discs in the multi-disc brake. The limiting factor here is the magnetic force required to release the brake. A sufficiently large magnetic flux through the brake coils must be achieved, which magnetic flux attracts the armature plate towards the brake coil holder or the brake coil, thereby releasing the discs and thus the multi-disc brake.

The simplest solution to achieve a stronger magnetic flux would be to extend the brake with so many discs that the desired higher braking effect is achieved. However, this extremely extends the entire drive housing. Also, an increase in the diameter of the brake or the brake coil holders and the brake coil only results in an increase in the size of the drive housing, which is also undesirable.

In EP2135767, the brake with a brake housing and yoke-like brake coil holders was placed in the drive housing in order to save space.

A typical yoke-type brake coil holder with a brake coil that has a square cross-sectional area is schematically shown in FIG. 1. The yoke-like brake coil holder is U-shaped and has three legs which surround the windings embedded inside on three sides. These legs must have a minimum cross-sectional area so that the magnetic field saturation within the ferromagnetic legs is not too small. On the open side of the U-shaped brake coil holder, the armature plate is shown in the attracted state, in practice the multi-disc brake being released in this way.

The armature plate is attracted by a current flow through the brake coil, which induces a magnetic field. The field lines are indicated here as dashed lines. Since the U-shaped brake coil holder and the armature plate are made of a ferromagnetic material, a closed magnetic return path is achieved and, if the magnetic flux is sufficiently high, the armature plate can be attracted towards the U-shaped brake coil holder.

Furthermore, enlarged U-shaped brake coil holders for enlarged brake coils, which take up more and more space in the drive housing, are known from the prior art. The magnetic flux is a function of the cross-sectional area of the brake coil and of the thickness of the legs of the brake coil holder. This seems to be absolutely necessary, since a sufficiently high magnetic flux cannot be achieved if the brake coil cross-section is too small. In order to place such an enlarged brake in the drive housing, the drive housing must be greatly enlarged.

The braking torque that can be generated with a parking or emergency brake designed as a spring-actuated electromagnetic multi-disc brake must be at least as high as the highest possible drive torque of the electric motor. The drive shaft of the vehicle drive is to be set in motion by the electric motor only after successful release of the multi-disc brake. Since the installation space within the drive housing is very limited, a parking or emergency brake can only be achieved if U-shaped brake coil holders and inserted brake coils are enlarged. If the brake components are enlarged, a brake housing surrounding the multi-disc brake also becomes larger and larger, so that the installation space of the multi-disc brake becomes necessarily larger if a higher magnetic force is to be achieved.

SUMMARY

The disadvantages described above and known from the prior art are to be eliminated by the present device.

Accordingly, one aspect of the disclosure relates to a multi-disc brake with reduced space requirement as well as a vehicle drive with a downsized multi-disc brake, which can be accommodated in a compact drive housing which is as small as possible and in which an electric motor is also arranged.

The braking torque achievable with the multi-disc brake should be at least as high as the highest possible drive torque of the electric motor.

In the best case, the design of the drive housing should not differ when replacing a hydraulic motor with an electric motor, so that existing vehicles with a vehicle drive based on a hydraulic motor can also be converted with the drive housing including electric motor and electromagnetic multi-disc brake.

This patent application proposes to design the entire multi-disc brake without a housing, i.e. without a housing enclosing the entire multi-disc brake. In addition, the shape or cross-sectional area of the brake coil holders is modified and the magnetic field lines are guided through the wall of a ferromagnetic insert, whereby a sufficiently high braking effect, thus an attracting effect on the armature plate can be achieved.

Variations of feature combinations or minor adaptations of the invention can be found in the detailed description and are illustrated in the drawings.

BRIEF DESCRIPTION OF THE DRAWINGS

The subject matter of the invention is described in detail below in connection with the attached drawings. Necessary features, details and advantages of the invention arise from the following description, wherein a preferred embodiment of the invention and some additional features or optional features are specified in detail.

FIG. 1 shows a schematic sectional view of a U-shaped brake coil holder known from the prior art which has a brake coil and which, together with an armature plate, forms a yoke for the magnetic return path.

FIG. 2 shows a longitudinal section of a vehicle drive with a drive housing comprising a drive support, a motor support and a transmission support, wherein a multi-disc brake is in a braking position, while FIG. 3 shows a longitudinal section through the drive support and the components of the multi-disc brake in braking position.

FIG. 4 shows a schematic sectional view through the installed multi-disc brake in the region of a brake coil holder, with the multi-disc brake being in a released position.

DETAILED DESCRIPTION

A complete vehicle drive 1 comprises a drive housing 2 which comprises a drive support 20, a motor support 21 and a transmission support 22. The drive support 20 is the central component which is fixed to a vehicle and is immovable like the motor support 21. A brake chamber is recessed in the drive support 20, in which brake chamber a multi-disc brake 3 is mounted as parking or emergency brake. A drive shaft 4 passes through the drive support 20, motor support 21 and the transmission support 22. A coupling flange 220 for attaching chains, for example, is arranged on the wall of the rotatable transmission support 22, which can also be referred to as a drum.

In the interior of the motor support 21, an electric motor 5 is arranged, which has a construction consisting of a rotor part and a stator part as known to the person skilled in the art. The operation and control of the electric motor 5 is implemented through known wiring and control electronics, which is not shown, the electric motor 5 usually being monitored by at least one sensor. The electric motor 5 drives the centrally traversing drive shaft 4. The dimensions of the electric motor 5 are matched to the mass of the motor support 21, wherein no empty spaces are left, if possible. To ensure that the drive shaft 4 can rotate with as little friction as possible, suitable bearings, usually ball bearings, which will not be discussed in further detail here, are fitted between motor support 21 and drive support 20.

Inside the transmission support 22, a transmission 6, designed in particular as a planetary transmission, is arranged in operative connection with the drive shaft 4. The transmission 6 is connected to the drive shaft 4. This allows the transmission support 22 to be controlled in different operating modes and rotated relative to the drive support 20 and motor support 21. Braking the drive shaft 4 or the transmission support 22 can be performed during operation by controlling the electric motor 5. The parking or emergency brake described in the following serves as a dead man's handle, so that torque can only be transmitted to the drive shaft 4 when the parking or emergency brake is actuated, i.e., the transmission support 22 can only then be rotated. Only when the parking or emergency brake is actuated, i.e. released, the vehicle drive 1 moves.

As shown in FIG. 3, the multi-disc brake 3 comprises an annular brake coil holder 30. The latter can be fitted onto the drive shaft 4 so that the drive shaft 4 can rotate in a central recess of the brake coil holder 30. The entire multi-disc brake 3 is arranged between the drive shaft 4 and the surrounding drive support 2, which is also made of a ferromagnetic material. In the braking position, a gap S is formed between armature plate 33 and brake coil holder 30. The armature plate 33 is movably mounted on the drive shaft 4.

The brake coil holder 30 in its extent has a substantially rectangular brake coil holder area 300. In contrast to the U-shaped brake coil holder with three legs known from the prior art, here, the brake coil holders 30 have only one leg with the substantially rectangular brake coil holder area 300. The brake coil holder 30 and the brake coil 31 arranged on the brake coil holder 30 concentrically surround the drive shaft 4. The brake coil holder 30 is made of ferromagnetic material so that a magnetic flux can pass through it. Around the brake coil holder 30, along an outer side of the brake coil holder 30, a brake coil 31 having a multiplicity of windings is arranged away from the center of the brake coil holder 30 and thus away from the drive shaft 4. The available winding space is preferably utilized when wound with a filling factor as high as possible, so that high magnetic field strengths can be achieved due to a maximum number of windings. Brake coils 31 of this type usually have enamelled copper wire.

To simplify the arrangement of the brake coil 31, a U-profile made of a non-ferromagnetic material is attached here to the brake coil holder 30, in which the windings are fixed. However, this is not absolutely necessary.

Along the circular circumference of the annular brake coil holder 30, at least one compression spring 32 is arranged here, which can be of different design. The compression spring 32 presses an armature plate 33 with a disc support 330 and a plurality of armature plate discs 331 in the axial direction away from the brake coil holder 30. Accordingly, the brake coil holder 30 and the armature plate 33 are designed to be movable in relation to each other, wherein the arrangement in a brake chamber of the drive support 20 allows only linear movement in the direction of the axis of rotation D of the drive shaft 4. The armature plate 33, the disc support 330 and the armature plate discs 331 are formed to be substantially annular and extend concentrically around the drive shaft 4.

Drive shaft discs 40 are fixed to the drive shaft 4 at the height of the armature plate discs 331.

If the multi-disc brake 3 is not actuated as a parking or emergency brake, thus, is in the braking position, the compression spring 32 presses the armature plate 33 and thus the armature plate discs 331 axially in the direction of the motor support 21. In the course of this, a gap is formed between the brake coil holder 30 and the armature plate 33 and the armature plate discs 331 press against the drive shaft discs 40, thereby braking the drive shaft 4. Thereby, rotation of the drive shaft 4 is prevented, wherein the spring force of the compression spring 32 must be, of course, correspondingly high. The drive shaft 4 is mounted such that it can move purely rotatively, so that the arrangement of the drive shaft discs 40 remains relatively fixed along the axis of rotation D.

If the multi-disc brake 3 is actuated, thus, is brought into a released position, an electrical voltage is applied to the brake coil 31 by means of a control device, which is not shown, and wiring, so that a resulting current flow induces a magnetic field. The field lines are indicated. Due to the magnetic field strength or the magnetic flux, the armature plate 33 including the armature plate discs 331 is pulled axially in the direction of the field lines or the brake coil 31 against the force of the compression spring 32. As a result of the linear relative displacement of the armature plate discs 331 towards the drive shaft discs 40, the drive shaft 4 is released. The drive shaft 4 can only rotate when the multi-disc brake 3 is in the released position.

Since the brake coil holder 30 is annular, only part of the sectional view through the multi-disc brake 3 is shown in detail here. The description applies accordingly to the mirrored portion of the multi-disc brake 3 on the opposite side of the drive shaft 4.

In contrast to the prior art, the brake coil holder is not designed as a ring with a substantially U-shaped profile. It has been found that a simplified cross-sectional area of the brake coil holder 30 is sufficient if other components are manufactured and arranged accordingly.

In the braking position, the compression spring 32 pushes the armature plate 33 linearly axially away from the brake coil holder 30 and the brake coil 31, thereby pushing the disc support 330 on the armature plate 33 axially away and the armature plate discs 331 press against the drive shaft discs 40 on the drive shaft 4.

When the multi-disc brake 3 is released, thus actuated by the application of current, a magnetic field is induced and a magnetic return path is formed around the brake coil 31, wherein the field lines, as indicated by the dashed lines in FIG. 4, pass through a part of the wall of the drive support 20, the brake coil holder 30 and the armature plate 33. The magnetic return path can be configured in the form of a closed magnetic circuit through the brake coil holder 30, the wall of the ferromagnetic drive support 20 surrounding the brake coil 31 and the brake coil holder 30, and the ferromagnetic armature plate 33.

Since the cross-sectional area of the brake coil 31 is larger here in relation to the cross-sectional area of the brake coil holder 30, increased magnetic flux is formed and a high braking effect is achieved. The sum of the cross-sectional areas of the brake coil 31 and the brake coil holder 30 has remained the same. To achieve the higher braking effect, the brake coil holder 30 is provided with only one linear leg, the cross-sectional area of the brake coil 31 is increased and the brake coil is surrounded on two sides by the wall of the ferromagnetic drive support 20.

Even if the wall of the ferromagnetic drive support 20 does not rest directly against the brake coil 31, the magnetic return path is formed as shown in FIG. 4.

The yoke for forming the maximized magnetic flux around the brake coil 31 is formed here by the ferromagnetic brake coil holder 30 having a rectangular brake coil holder area 300 and a part of the wall of the ferromagnetic drive support 20 and the armature plate 33. With such a yoke, consisting of at least three parts, the magnetic force or the magnetic attraction effect can be increased since the cross-sectional areas of the individual parts are enlarged compared with the prior art.

As indicated in FIG. 4, an axial length L of the brake coil holder 30 and a width B of the brake coil holder 30 can be defined. Since the brake coil holder 30 preferably has only one leg with a rectangular brake coil holder area 300, the leg can be designed here to be as long as a length of the brake coil 31.

Part of the wall of the drive support 20 surrounds the brake coil holder 30 on one side and the brake coil holder 31 on two sides, thereby forming the yoke for the magnetic flux. This may result in each case in a small gap between the wall of the drive support 20 and the surfaces of the brake coil holder 30 and brake coil holder 31. In order for the armature plate 33 to be linearly movable, it must not be fixed to the wall of the drive support 20.

Due to the design of the yoke, the axial length of the brake coil 31 can be selected to be at most 10% smaller than the axial length L of the brake coil holder 30. Accordingly, a higher magnetic flux density can be achieved due to the larger brake coil 31.

To prevent the brake coil holder 30, the armature plate 33 and the part of the wall of the drive support 20 from becoming magnetically saturated too early, the dimensions should be as large as possible, with the smallest width being the limiting factor. The widths of the wall of the drive support 20, the armature plate 33 and the brake coil holder 30 should at best be the same size.

In contrast to the prior art, the present multi-disc brake 3 is designed without a housing since the brake components 30, 31, 32, 33 are not enclosed in a brake housing. A brake housing is intentionally omitted, which means that less space is required for the multi-disc brake 3 in the brake chamber.

Here, the multi-disc brake 3 or the brake chamber within the drive support 20 is operated dry. By filling the brake chamber with oil, however, the multi-disc brake 3 could be operated "wet", which would further increase its wear resistance.

The multi-disc brake 3 shown here has a multi-part yoke consisting of a brake coil holder 30 and a drive support 20, in which by embedded windings of a brake coil 31, an optimized electromagnet with a reinforced magnetic field over an equally large cross-sectional area is achieved when current is applied. By splitting the yoke, the magnetic flux is greater than in a known integral yoke.

In a modification, the brake coil 31 can be held by a non-ferromagnetic profile on the brake coil holder 30, as indicated in FIG. 3. Since such a profile does not contribute to the magnetic effect or braking effect, it is made of non-ferromagnetic material. It is only used to hold the windings on the brake coil holder 30.

In a modified form, the brake coil holder 30 can also have two legs and can have an approximately L-shaped configuration. Here again, the brake coil 31 extends resting on a leg, wherein a side wall is formed next to the brake coil 31 due to the second leg.

The cross-section over the extent of the yoke can preferably be constant. Thus, the thickness of the drive support 20 could be thinner than the thickness of the brake coil holder 30.

REFERENCE LIST 1 vehicle drive
2 drive housing
20 drive support (central, fixed, ferromagnetic)
21 motor support (fixed, encloses motor)
22 transmission support (drum, rotatable)
220 coupling flange
3 multi-disc brake/parking or emergency brake
30 brake coil holder
300 brake coil holder area
L axial length of the brake coil holder
B width of the brake coil holder
31 brake coil
32 compression spring (when the brake is not actuated, then the compression spring brakes by pressing the armature plate discs axially onto the drive shaft discs)
33 armature plate
330 disc support
331 armature plate discs
4 drive shaft
40 drive shaft discs
D axis of rotation/axial direction
S gap
5 electric motor, rotor/stator
6 transmission

The invention claimed is:

1. A multi-disc brake as a parking or emergency brake, which is installable in an interior of a drive support of a vehicle drive, comprising an annular brake coil holder with a wound brake coil, an armature plate with a disc support to which a multiplicity of armature plate discs is fastened, wherein a compression spring brings about a linear spacing of the brake coil holder from the linearly movable armature plate made of a ferromagnetic material in a braking position of the multi-disc brake and, when current is applied to the brake coil, a released position of the multi-disc brake is creatable by attracting the armature plate in the direction of the brake coil holder, wherein the braking effect results from the interaction of the armature plate discs with drive shaft discs on a drive shaft,
wherein
the drive support, the brake coil holder and the armature plate are made of ferromagnetic material,
the brake coil holder area of the brake coil holder and the cross-sectional area of the brake coil are substantially of rectangular single-legged design, and when installing the multi-disc brake, part of the wall of the drive support surrounds the brake coil on two sides and the brake coil holder on one side, and
thereby a yoke having at least three parts is formed from the wall of the drive support, the brake coil holder and the armature plate, in which a magnetic flux can be formed as a closed magnetic circuit.

2. The multi-disc brake according to claim 1, wherein the multi-disc brake is designed without a housing and the brake coil and brake coil holder partially rest directly against a part of the wall of the drive support.

3. The multi-disc brake according to claim 1, wherein an axial length of the brake coil is at most 10% smaller than the axial length of the brake coil holder.

4. The multi-disc brake according to claim 1, wherein the cross-sectional area of the brake coil is larger than the brake coil holder area.

5. The multi-disc brake according to claim 1, wherein the width in axial direction of the armature plate, the width of the brake coil holder perpendicular to the axial direction and the thickness of the wall of the drive support in axial direction and in a direction perpendicular to the axial direction are at least approximately equal in size.

6. The multi-disc brake according to claim 1, wherein the multi-disc brake is designed without a housing, a part of the wall of the drive support surrounds the brake coil on two sides and the brake coil holder on one side, thereby forming a gap.

7. The multi-disc brake according to claim 1, wherein the brake coil is held by a non-ferromagnetic profile on the brake coil holder.

8. A vehicle drive for vehicles with torques greater than 800 Nm and speeds less than 60 km/h, comprising a drive housing with a drive support, a motor support in which an electric motor is arranged, and a transmission support in which a transmission is arranged, wherein the electric motor and the transmission are arranged connected via a drive shaft,
wherein
the multi-disc brake according to claim 1 is mounted in an operatively connected manner in the drive support made of a ferromagnetic material, so that when actuating the multi-disc brake, a magnetic return path in the form of a closed magnetic circuit is configurable such that the magnetic return path passes through the brake coil holder, the wall of the ferromagnetic drive support, which surrounds the brake coil and the brake coil holder, and the ferromagnetic armature plate.

9. A ferromagnetic drive support, which is operatively connected to the multi-disc brake according to claim 1, as part of the multi-disc brake, wherein in a released position and upon actuating the multi-disc brake, the magnetic flux passing through a part of the wall of the drive carrier, the armature plate and the annular brake coil holder is closed to form a magnetic return path, whereby the armature plate is attracted towards the brake coil holder against the spring force of the compression spring and rotation of the drive shaft is enabled, and in a braking position after releasing the multi-disc brake, a gap is formed between the armature plate and the brake coil holder, thereby pressing the armature plate discs against the drive shaft discs so that rotation of the drive shaft is prevented.

\* \* \* \* \*